(12) United States Patent  (10) Patent No.: US 7,620,238 B1
Zirker  (45) Date of Patent: Nov. 17, 2009

(54) VIRTUAL REALITY COLOR SAMPLER

(76) Inventor: Daniel R. Zirker, 2040 W. 12130 St., Riverton, UT (US) 84065

( * ) Notice: Subject to any disclaimer, the term of this patent is extended or adjusted under 35 U.S.C. 154(b) by 0 days.

(21) Appl. No.: 10/891,245

(22) Filed: Dec. 6, 2004

(51) Int. Cl.
*G06K 9/00* (2006.01)

(52) U.S. Cl. ........................... 382/162; 382/167

(58) Field of Classification Search ............... 382/167, 382/162; 358/504, 518, 523, 507, 540; 705/40; 400/635, 636; 271/7, 198; 715/201; 356/421, 356/245.5; 422/55; 348/32, 207.2
See application file for complete search history.

(56) References Cited

U.S. PATENT DOCUMENTS

| | | | | |
|---|---|---|---|---|
| 5,685,657 A | * | 11/1997 | Jablonski | 400/635 |
| 5,760,913 A | * | 6/1998 | Falk | 382/167 |
| 5,875,437 A | * | 2/1999 | Atkins | 705/40 |
| 6,141,120 A | * | 10/2000 | Falk | 358/504 |
| 6,160,666 A | | 12/2000 | Rallison et al. | 359/630 |
| 6,166,744 A | | 12/2000 | Jaszlics et al. | 345/629 |
| 6,519,360 B1 | | 2/2003 | Tanaka | 382/162 |
| 6,529,202 B2 | | 3/2003 | Wu | 345/593 |
| 2002/0027561 A1 | | 3/2002 | Wu | 345/593 |

* cited by examiner

*Primary Examiner*—Anh H Do

(57) ABSTRACT

A virtual reality color sampler for displaying prospective colors for an item has an alphanumeric keyboard connected to a color card scanner. A virtual reality goggle is connected to the alphanumeric keyboard for displaying video images. A microprocessor is electrically connectable to the color card scanner, the alphanumeric keyboard, the virtual reality goggle and is programmable to output colors to the virtual reality goggle that match the color scanned into the color card scanner.

18 Claims, 3 Drawing Sheets

VIRTUAL REALITY COLOR SAMPLER

BACKGROUND OF THE INVENTION

1. Field of the Invention

The present embodiment of the invention relates to a virtual reality color sampler for use in connection with virtual reality devices. The virtual reality color sampler has particular utility in connection with virtual reality devices capable of changing item colors.

2. Description of the Prior Art

Virtual reality color samplers are desirable for creating a three dimensional replica of an interior or exterior residence space and showing changes in the coloring of walls, floors and ceilings. A need was felt for a virtual reality color sampler that had a color scanner and a pair of virtual reality goggles for allowing users to see how a color would appear in their residence space.

The use of virtual reality devices is known in the prior art. For example, U.S. Pat. No. 6,539,202 to Wu discloses a color adviser comprising a plurality of image elements having color information associated therewith. Initially, the image elements are grouped into a plurality of image element groups on the basis of their colors. An initial representative color is then generated for each of the image element groups, the initial representative colors subsequently being clustered together into color clusters in a color space. Finally, an image representative color is determined based on each respective color cluster. Also shown is a method of using one or more of the image representative colors as a basis for providing one or more aesthetic color suggestions for a given image. A set of color selection rules is provided, and an aesthetic color suggested on the basis thereof. However, the Wu '202 patent does not have a color sample scanner, nor does it have virtual reality goggles for viewing an object the color of the color sample.

Similarly, U.S. Pat. No. 6,519,360 to Tanaka discloses an image data processing apparatus for comparing images based on color feature information of images. The image data processing apparatus has a color group sorting table that stores information for sorting colors to a plurality of color groups. The image data processing apparatus counts color elements of each pixel of the image for every color group with reference to the color group sorting table. The image data processing apparatus obtains a representative color of each color group based on values of the color elements of pixels in every color group and an occupancy ratio of pixels counted for every color group to all pixels of the image, thereby extracts the color feature of the image. The image data processing apparatus compares images based on the color feature and searches desired images from an image database. However, the Tanaka '360 patent does not have a color sample scanner, nor does it have virtual reality goggles for viewing an object the color of the color sample.

Likewise, U.S. Pat. No. 6,160,666 to Rallison et al. discloses a personal visual display device is provided for delivering a generated image, preferably combinable with environment light, to the eye of a user. The device is lightweight and compact but yields a high quality image. In one embodiment, a color shutter provides a high-density color image. In one embodiment, a shroud protects from stray light and holds optical elements in desired alignment. In one embodiment an image generator is masked by at least two masks to provide for a high quality image without waste. In one embodiment, a removably mounted shield or activatable device can convert the apparatus from a see-through device to an immersion device and back again. In one embodiment, the device can be comfortably mounted to the user's head while still allowing for use of conventional eyeglasses. In one embodiment various controls, such as a mute button, volume control and the like can be provided, such as by mounting on the head-mounted display device. However, the Rallison et al. '666 patent does not have a color sample scanner, nor does it have virtual reality goggles for viewing an object the color of the color sample.

Correspondingly, U.S. Pat. No. 6,166,744 to Jaszlics et al. discloses a system for combining virtual images with images of the real world. A range scanner determines the shape and distance of real-world objects within a field of interest to the observer using the apparatus. Virtual masking objects, which are simplified computer models of real-world objects, are derived from the range data. Virtual entities that are not present in the real world are simulated in an electronic computer. Images of the virtual entities and the virtual masking objects are combined into masked virtual images. The masked virtual images show the portions of virtual entities that would be visible if these entities actually existed in the real world. The masked virtual images and images of the real world scene are combined in such a manner that the virtual images appear to be obscured, when appropriate for their simulated, virtual location by real-world objects. The resulting combined image is presented in an electronic or optical display. However, the Jaszlics et al. '744 patent does not have a color sample scanner, nor does it have virtual reality goggles for viewing an object the color of the color sample.

Further, United States Patent Disclosure 2002/0027561 to Wu discloses a color adviser comprising a plurality of image elements having color information associated therewith. Initially, the image elements are grouped into a plurality of image element groups on the basis of their colors. An initial representative color is then generated for each of the image element groups, the initial representative colors subsequently being clustered together into color clusters in a color space. Finally, an image representative color is determined based on each respective color cluster. Also shown is a method of using one or more of the image representative colors as a basis for providing one or more aesthetic color suggestions for a given image. A set of color selection rules is provided, and an aesthetic color suggested on the basis thereof. However, the Wu '561 patent does not have a color sample scanner, nor does it have virtual reality goggles for viewing an object the color of the color sample.

Lastly, United States Patent Number Des. 439,265 to Hayashi discloses a spectacles-shaped display. However, the Hayashi '265 patent does not have a color sample scanner, nor does it have virtual reality goggles for viewing an object the color of the color sample.

While the above-described devices fulfill their respective, particular objectives and requirements, the aforementioned patents do not describe a virtual reality color sampler that allows virtual reality devices capable of changing item colors. The Wu '202, Tanaka '360, Rallison et al. '666, Jaszlics et al. '744, Wu '561 and Hayashi '265 patents make no provision for a color sample scanner, nor does it have virtual reality goggles for viewing an object the color of the color sample.

Therefore, a need exists for a new and improved virtual reality color sampler which can be used for virtual reality devices capable of changing item colors. In this regard, the present embodiment of the invention substantially fulfills this need. In this respect, the virtual reality color sampler according to the present embodiment of the invention substantially departs from the conventional concepts and designs of the prior art, and in doing so provides an apparatus primarily developed for the purpose of virtual reality devices capable of changing item colors.

SUMMARY OF THE INVENTION

In view of the foregoing disadvantages inherent in the known types of virtual reality devices now present in the prior art, the present embodiment of the invention provides an improved virtual reality color sampler, and overcomes the above-mentioned disadvantages and drawbacks of the prior art. As such, the general purpose of the present embodiment of the invention, which will be described subsequently in greater detail, is to provide a new and improved virtual reality color sampler and method which has all the advantages of the prior art mentioned heretofore and many novel features that result in a virtual reality color sampler which is not anticipated, rendered obvious, suggested, or even implied by the prior art, either alone or in any combination thereof.

To attain this, the present embodiment of the invention essentially comprises an alphanumeric keyboard connected to a color card scanner. A virtual reality goggle is connected to the alphanumeric keyboard for displaying video images. A microprocessor is electrically connectable to the color card scanner, the alphanumeric keyboard, the virtual reality goggle and is programmable to output colors to the virtual reality goggle that match the color scanned into the color card scanner.

There has thus been outlined, rather broadly, the more important features of the embodiment of the invention in order that the detailed description thereof that follows may be better understood and in order that the present contribution to the art may be better appreciated.

The present embodiment of the invention may also include a video monitor, a padding strip and a power source connection. There are, of course, additional features of the present embodiment of the invention that will be described hereinafter and which will form the subject matter of the claims attached.

Numerous objects, features and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

It is therefore an object of the present embodiment of the invention to provide a new and improved virtual reality color sampler that has all of the advantages of the prior art virtual reality devices and none of the disadvantages.

It is another object of the present embodiment of the invention to provide a new and improved virtual reality color sampler that may be easily and efficiently manufactured and marketed.

An even further object of the present embodiment of the invention is to provide a new and improved virtual reality color sampler that has a low cost of manufacture with regard to both materials and labor, and which accordingly is then susceptible of low prices of sale to the consuming public, thereby making such virtual reality color sampler economically available to the buying public.

Still another object of the present embodiment of the invention is to provide a new virtual reality color sampler that provides in the apparatuses and methods of the prior art some of the advantages thereof, while simultaneously overcoming some of the disadvantages normally associated therewith.

Even still another object of the present embodiment of the invention is to provide a virtual reality color sampler for virtual reality devices capable of changing item colors.

Lastly, it is an object of the present embodiment of the invention is to provide a virtual reality color sampler having a color scanner.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
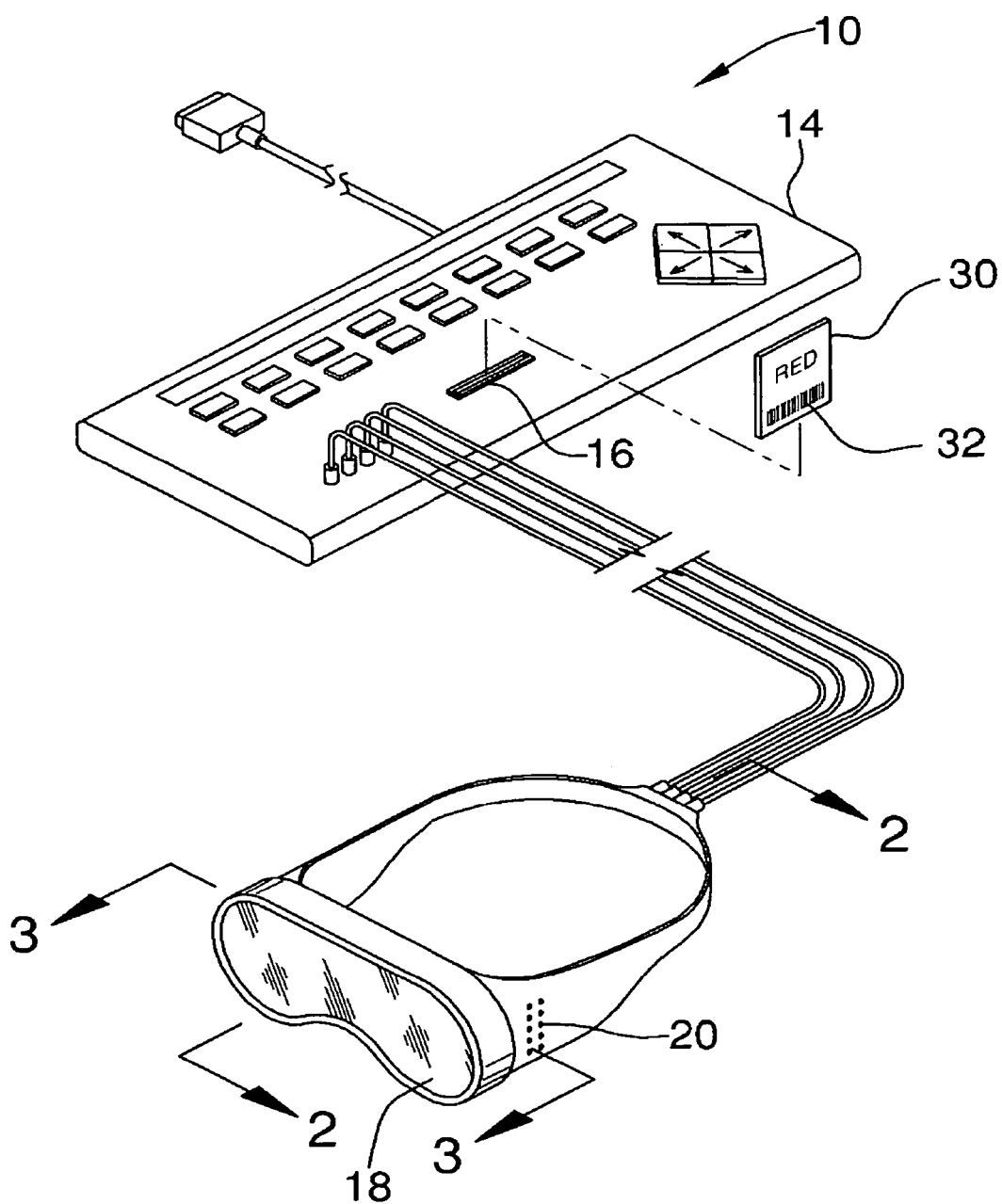
FIG. 1 is a top perspective view of the preferred embodiment of the virtual reality color sampler constructed in accordance with the principles of the present invention.

Referring now to the drawings, and particularly to FIGS. 1-5, a preferred embodiment of the virtual reality color sampler of the present invention is shown and generally designated by the reference numeral 10.

In FIG. 1, a new and improved virtual reality color sampler 10 of the present invention for virtual reality devices capable of changing item colors is illustrated and will be described. More particularly, the virtual reality color sampler 10 has a color card scanner 12 (shown in FIG. 4) for scanning a bar code 32 signifying colors marked on a color card 30. The color card scanner 12 is for scanning colors. An alphanumeric keyboard 14 is connected to the color card scanner 12. The color card scanner 12 is disposed within the alphanumeric keyboard 14. The alphanumeric keyboard 14 has a reader slot 16 therein. The reader slot 16 is disposed adjacent to the color card scanner 12. A virtual reality goggle 18 is connected to the alphanumeric keyboard 14. The virtual reality goggle 18 is for displaying video images. The virtual reality goggle 18 has a vent hole 20 therein.

Figure 2:
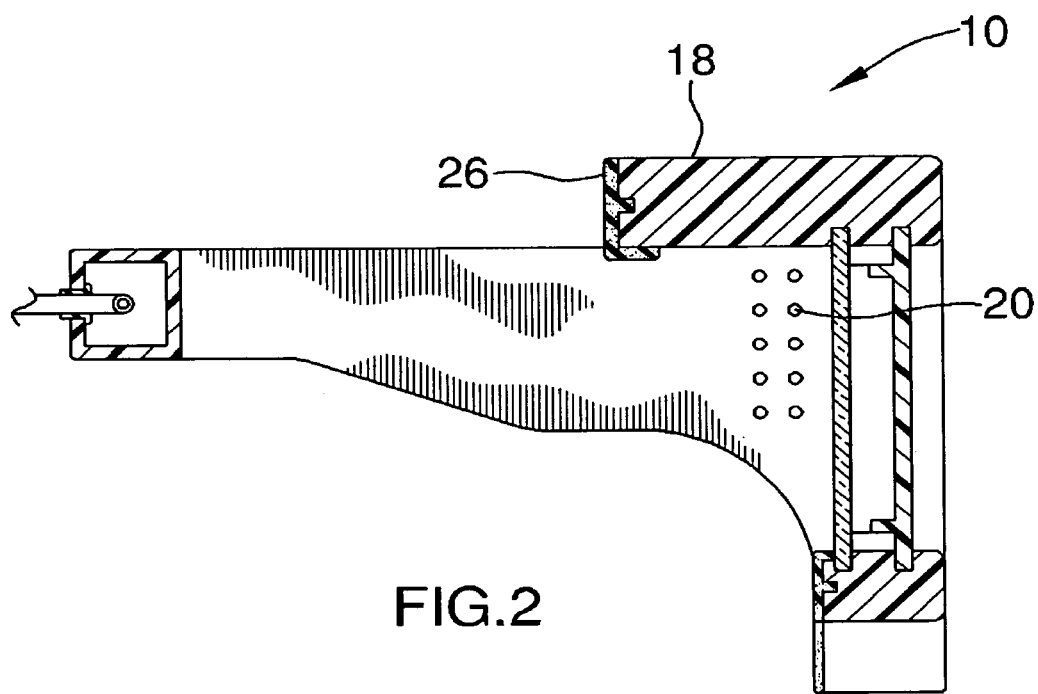
FIG. 2 is a section 2-2 view of FIG. 1 of the virtual reality color sampler of the present embodiment of the invention.

In FIG. 2, the virtual reality color sampler 10 is illustrated and will be described. More particularly, the virtual reality color sampler 10 has the virtual reality goggle 18 connected to the alphanumeric keyboard 14 (shown in FIG. 1). The virtual reality goggle 18 is for displaying video images. The virtual reality goggle 18 has the vent hole 20 therein. A padding strip 26 is connected to the virtual reality goggle 18.

Figure 3:
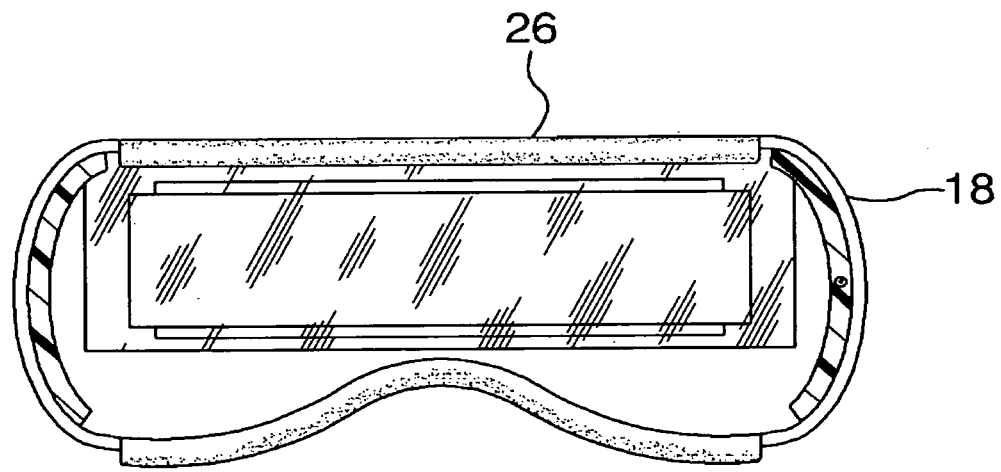
FIG. 3 is a section 3-3 view of FIG. 1 of the virtual reality color sampler of the present embodiment of the invention.

In FIG. 3, the virtual reality color sampler 10 is illustrated and will be described. More particularly, the virtual reality color sampler 10 has the virtual reality goggle 18 connected to the alphanumeric keyboard 14 (shown in FIG. 1). The virtual reality goggle 18 is for displaying video images. The padding strip 26 is connected to the virtual reality goggle 18.

Figure 4:
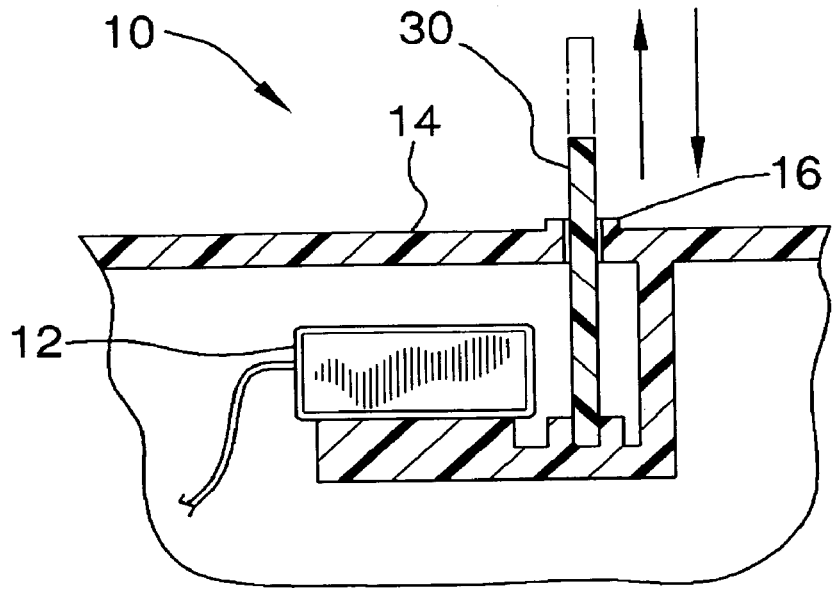
FIG. 4 is a section view of the virtual reality color sampler of the present embodiment of the invention.

In FIG. 4, the virtual reality color sampler 10 is illustrated and will be described. More particularly, the virtual reality color sampler 10 has the color card scanner 12 for scanning a bar code 32 signifying colors marked on a color card 30. The color card scanner 12 is for scanning colors. The alphanumeric keyboard 14 is connected to the color card scanner 12. The color card scanner 12 is disposed within the alphanumeric keyboard 14. The alphanumeric keyboard 14 has the reader slot 16 therein. The reader slot 16 is disposed adjacent to the color card scanner 12.

Figure 5:
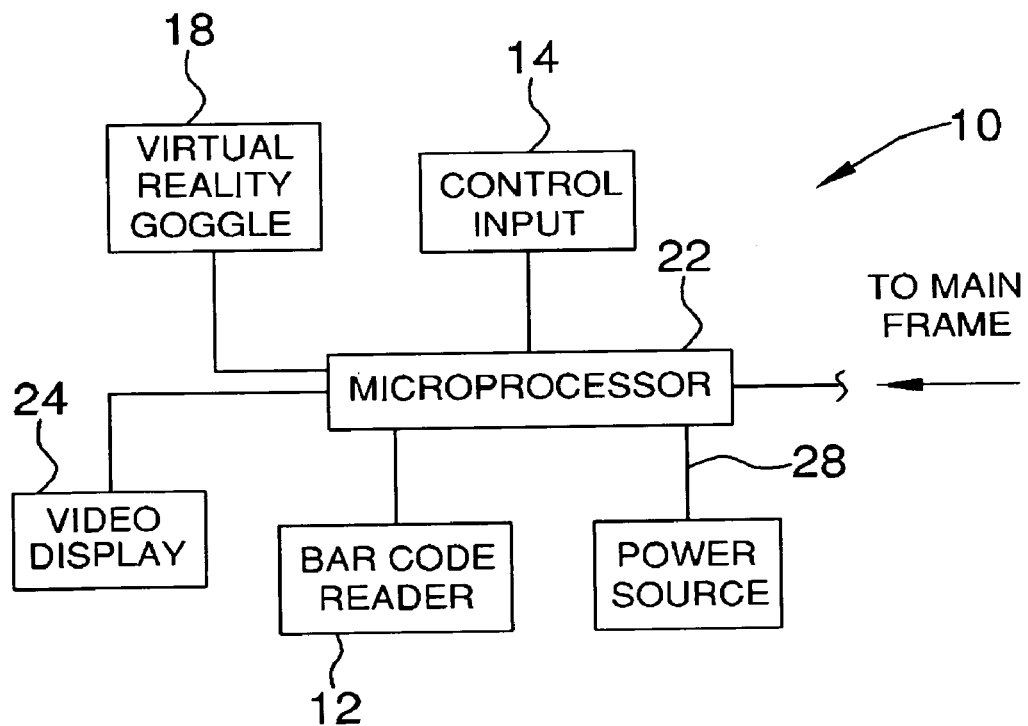
FIG. 5 is a block diagram view of the virtual reality color sampler of the present embodiment of the invention.

In FIG. 5, the virtual reality color sampler 10 is illustrated and will be described. More particularly, the virtual reality color sampler 10 has the color card scanner 12 for scanning bar code signifying colors. The color card scanner 12 is for scanning colors. A microprocessor 22 is electrically connectable to the color card scanner 12. The microprocessor 22 is electrically connectable to the alphanumeric keyboard 14. The microprocessor 22 is electrically connectable to the virtual reality goggle 18. The microprocessor 22 is programmable to output colors to the virtual reality goggle 18 that match the color scanned into the color card scanner 12. A video monitor 24 is electrically connectable to the microprocessor 22. A power source connection 28 is electrically connected to the microprocessor 22.

In use, it can now be understood that the color card is placed in the color card scanner and the computer assigns that color to the item selected in the virtual reality goggle or on the video monitor to show the user how the item would appear in that color.

While a preferred embodiment of the virtual reality color sampler has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention. For example, any suitable visual interface may be used instead of the virtual reality goggles described.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

I claim:

1. A virtual reality color sampler comprising:
   a color card having an outer surface, wherein said outer surface is marked with an insignia signifying a color;
   a color card scanner, wherein said color card scanner scans said insignia signifying a color;
   an alphanumeric keyboard connected to said color card scanner;
   a virtual reality goggle connected to said alphanumeric keyboard, said virtual reality goggle for displaying video images; and
   a microprocessor electrically connectable to said color card scanner, said microprocessor electrically connectable to said alphanumeric keyboard, said microprocessor electrically connectable to said virtual reality goggle, said microprocessor programmable to output colors to said virtual reality goggle to change the color of an item viewed through said virtual reality goggle to match the color scanned into said color card scanner.

2. The virtual reality color sampler of claim 1 further comprising:
   a video monitor electrically connectable to said microprocessor.

3. The virtual reality color sampler of claim 1 further comprising:
   a padding strip connected to said virtual reality goggle.

4. The virtual reality color sampler of claim 1 wherein:
   said virtual reality goggle has a vent hole therein.

5. The virtual reality color sampler of claim 1 wherein:
   said insignia is a bar code signifying a color; and
   said color card scanner is for scanning said bar code signifying a color.

6. The virtual reality color sampler of claim 1, further comprising:
   a plurality of color cards, wherein said plurality of color cards comprise a palette of colors.

7. The virtual reality color sampler of claim 1 further comprising:
   a power source connection electrically connected to said microprocessor.

8. The virtual reality color sampler of claim 1 wherein:
   said color card scanner is disposed within said alphanumeric keyboard.

9. The virtual reality color sampler of claim 1 wherein:
   said alphanumeric keyboard has a reader slot therein, said reader slot is disposed adjacent to said color card scanner.

10. A virtual reality color sampler comprising:
    a color card having an outer surface, wherein said outer surface is marked with an insignia signifying a color;
    a color card scanner, wherein said color card scanner scans said insignia signifying a color;
    an alphanumeric keyboard connected to said color card scanner;
    a virtual reality goggle connected to said alphanumeric keyboard, said virtual reality goggle for displaying video images;
    a microprocessor electrically connectable to said color card scanner, said microprocessor electrically connectable to said alphanumeric keyboard, said microprocessor electrically connectable to said virtual reality goggle, said microprocessor programmable to output colors to said virtual reality goggle to change the color of an item viewed through said virtual reality goggle to match the color scanned into said color card scanner; and a video monitor electrically connectable to said microprocessor.

11. The virtual reality color sampler of claim 10 further comprising:

a padding strip connected to said virtual reality goggle.

12. The virtual reality color sampler of claim 11 wherein: said virtual reality goggle has a vent hole therein.

13. The virtual reality color sampler of claim 12 wherein:
said insignia is a bar code signifying a color; and
said color card scanner is for scanning said bar code signifying a color.

14. The virtual reality color sampler of claim 13, further comprising a plurality of color cards, wherein said plurality of color cards comprise a palette of colors.

15. The virtual reality color sampler of claim 14 further comprising:

a power source connection electrically connected to said microprocessor.

16. The virtual reality color sampler of claim 15 wherein:
said color card scanner is disposed within said alphanumeric keyboard.

17. The virtual reality color sampler of claim 16 wherein:
said alphanumeric keyboard has a reader slot therein, said reader slot is disposed adjacent to said color card scanner.

18. A virtual reality color sampler comprising:

a plurality of color cards having an outer surface, wherein said outer surfaces are each marked with a bar code signifying a different color, and wherein said plurality of color cards comprise a palette of colors;

a color card scanner, said color card scanner is for scanning said bar code signifying a color, said color card scanner is for scanning said color cards and decoding said bar codes into colors;

an alphanumeric keyboard connected to said color card scanner, said color card scanner is disposed within said alphanumeric keyboard, said alphanumeric keyboard has a reader slot therein, said reader slot is disposed adjacent to said color card scanner;

a virtual reality goggle connected to said alphanumeric keyboard, said virtual reality goggle for displaying video images, said virtual reality goggle has a vent hole therein;

a microprocessor electrically connectable to said color card scanner, said microprocessor electrically connectable to said alphanumeric keyboard, said microprocessor electrically connectable to said virtual reality goggle, said microprocessor programmable to output colors to said virtual reality goggle to change the color of an item viewed through said virtual reality goggle to match the color decoded by said color card scanner;

a video monitor electrically connectable to said microprocessor;

a padding strip connected to said virtual reality goggle; and a power source connection electrically connected to said microprocessor.

* * * * *